Feb. 18, 1941.   G. A. LYON   2,231,931
WHEEL DISK CONSTRUCTION
Original Filed June 17, 1936   2 Sheets-Sheet 1
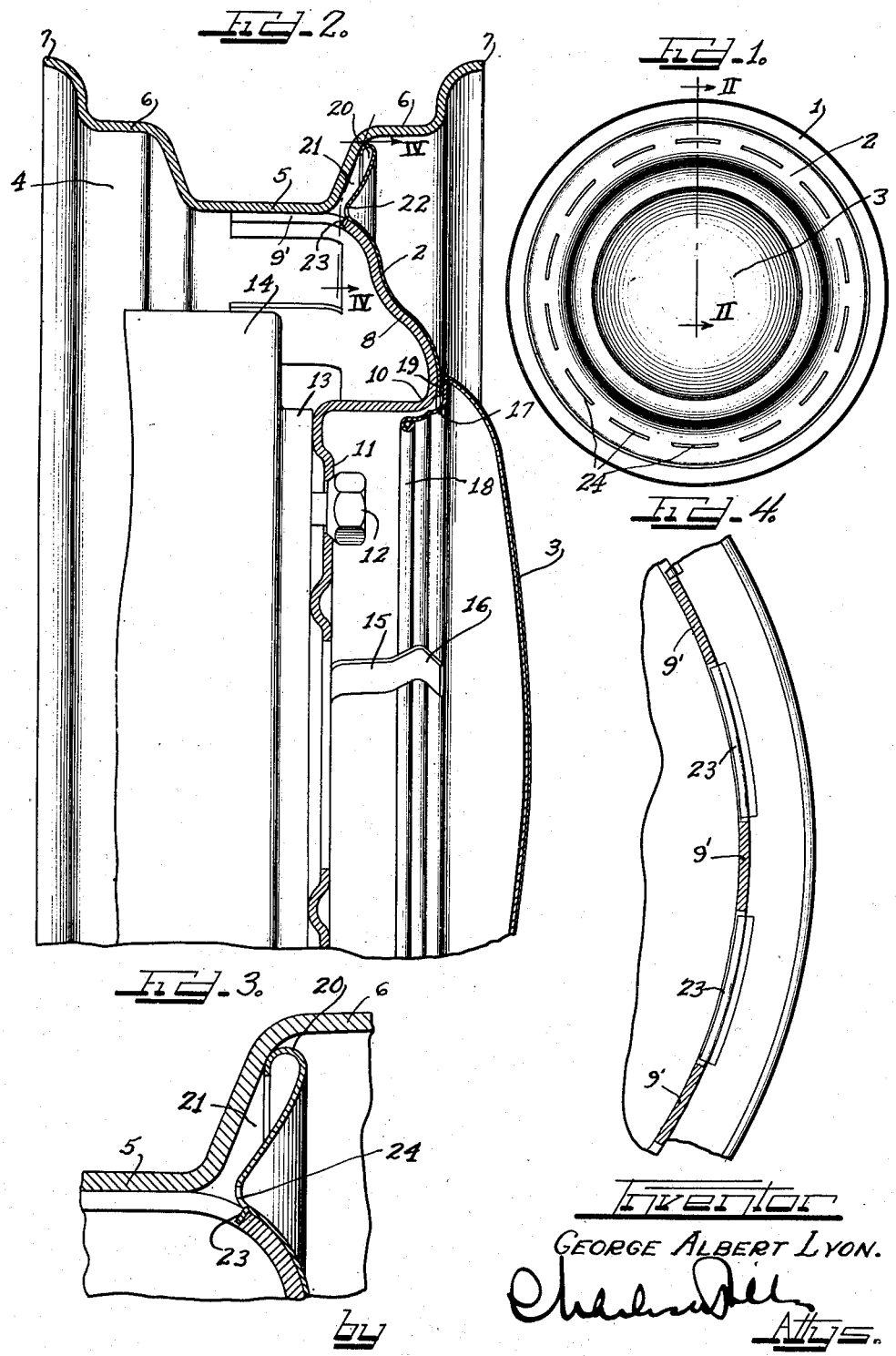
Inventor
GEORGE ALBERT LYON.

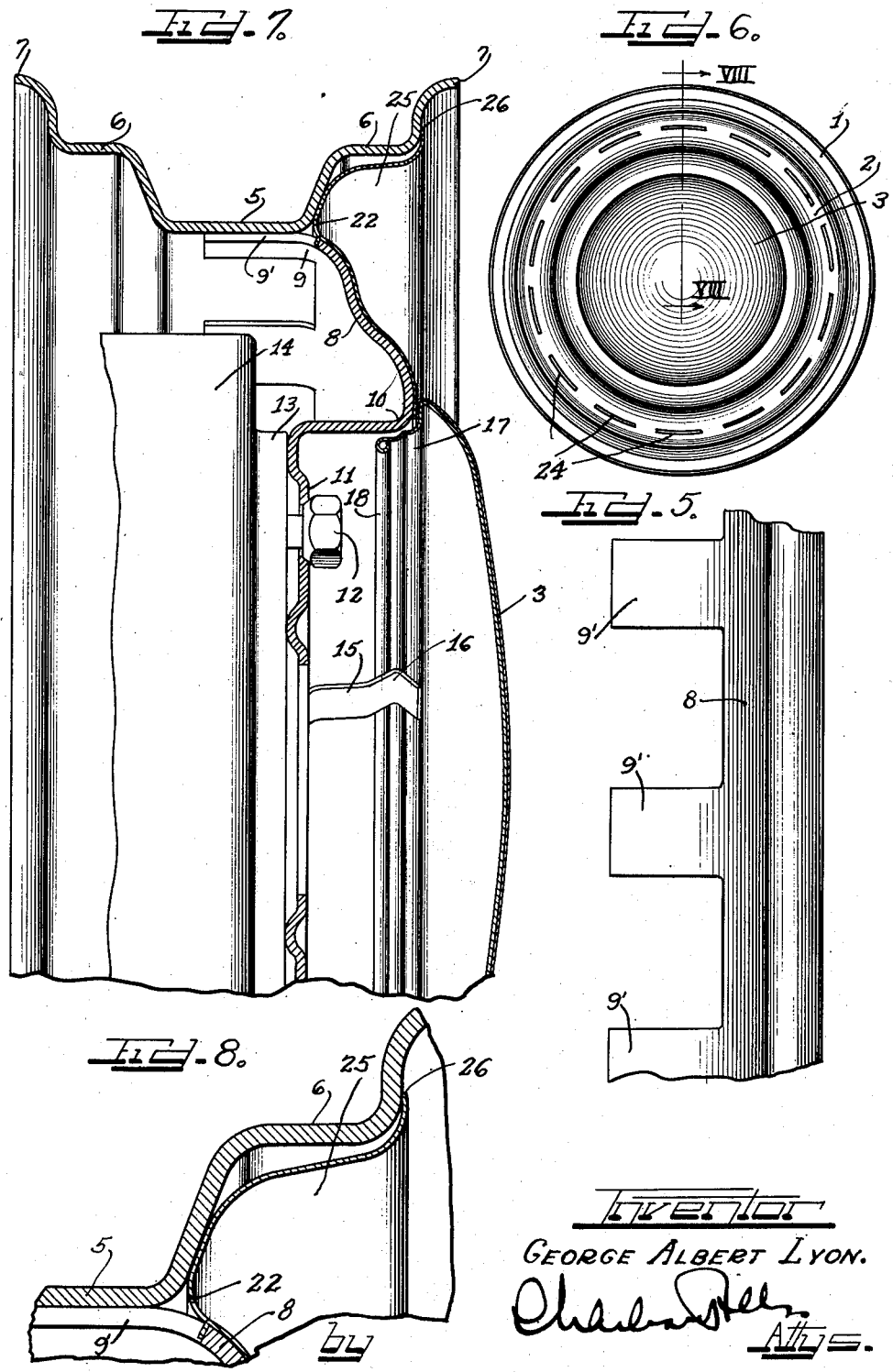

Patented Feb. 18, 1941

2,231,931

UNITED STATES PATENT OFFICE 2,231,931

WHEEL DISK CONSTRUCTION

George Albert Lyon, Allenhurst, N. J.

Application June 17, 1936, Serial No. 85,631
Renewed March 14, 1940

11 Claims. (Cl. 301—37)

This invention relates to improvements in wheel disk construction, and more particularly to wheel disks of the type which are adapted to be disposed over the outer side surface of a vehicle wheel to enhance the beauty and general attractiveness of the wheel and the vehicle as a whole.

In the manufacture of vehicle wheels, especially metallic wheels which include a metal rim and a metal body part connected to the rim, it is preferable in many cases to provide apertures or openings in the body part of the wheel so that air may circulate directly through the wheel and thus cool the brake drum. With wheels of this character, it is of course desirable to maintain the brake drum ventilation characteristics even though a wheel be equipped with a wheel disk.

With the foregoing in mind, it is one of the objects of my invention to improve the construction of ornamental wheel disks whereby they may be more economically manufactured and, at the same time, are rugged and reliable in use.

It is a further object of my invention to provide an ornamental wheel disk of novel construction which is provided with ventilation openings in communication with those on the wheel to provide a complete air circulation path through the wheel.

Another object of my invention is to provide a novel, ornamental wheel disk in which the ventilation openings in the wheel disk are in substantial coincidence with the ventilation openings in the wheel.

Still another object of my invention is to provide a novel ornamental sheet metal member, of the type which is adapted to extend over a substantial portion of the outer side surface of a vehicle wheel, and which is provided with a plurality of ventilation apertures by striking out tabs from the sheet metal member, the tabs being formed so as to extend through apertures in the vehicle to secure the ornamental member thereto.

Another feature of the invention is the provision of a wheel disk shaped to intimately overlie the body part of a vehicle wheel, but which is disposed in spaced relationship with respect to the rim of said vehicle wheel.

A further feature of the invention lies in the provision of a novel ornamental sheet metal member which is adapted to be disposed over the outer side surface of a vehicle wheel in such a manner as to provide a continuous air circulation passage between a portion of the member and a portion of the wheel, and in which the apertures communicating with the passageway in the wheel are in substantial coincidence with the communicating apertures of the sheet metal member.

A further object of my invention is to provide a novel means for securing an ornamental wheel disk of the type having ventilation openings therein to a wheel.

In the manufacture of vehicle wheels, the outer marginal edge of the nave or body part, and particularly that part of the nave which rests in intimate contact with the rim, is sometimes formed with a series of substantially equally spaced projections. In order to provide the necessary ventilation to the brake drum, these projections often extend slightly beyond the edge of the rim thereby leaving a plurality of apertures through which air may freely circulate.

It is one of the objects of my invention to provide novel ornamental wheel disks, for use in conjunction with wheels of the above type, having integral tabs or fingers which extend between and alternate with the projections on the naves of said wheels, and in which ventilation openings are provided in the disk in proximity to the space portion between the nave projections.

The novel features which I believe to be characteristic of my invention are set forth with particularity in the appended claims.

My invention, however, together with further objects and advantages thereof, may best be understood by reference to the following description taken in connection with the accompanying drawings, in which:

Figure 1 is a side elevational view of a vehicle wheel, minus the tire, equipped with a wheel disk embodying the improvements of the present invention;

Figure 2 is an enlarged vertical view partly in cross section of a portion of the structure shown in Figure 1, taken substantially as indicated by the line II—II of Figure 1;

Figure 3 is an enlarged fragmentary sectional view of a portion of the structure in the upper right-hand part of Figure 2.

Figure 4 is a fragmentary vertical sectional view, taken substantially as indicated by the line IV—IV of Figure 2, looking in the direction of the arrows;

Figure 5 is an enlarged fragmentary view of the marginal edge of the nave or body part of the vehicle wheel shown in Figures 1 and 2;

Figure 6 is a side elevational view of a vehicle wheel equipped with a different form of wheel disk embodying principles of the present invention;

Figure 7 is an enlarged fragmentary vertical sectional view, with parts in elevation, taken substantially as indicated by the line VII—VII of Figure 6;

Figure 8 is an enlarged fragmentary sectional view of the upper right-hand portion of Figure 7.

Referring now to Figures 1 and 2 of the drawings, the wheel assembly illustrated thereby comprises in general a wheel 1, an ornamental wheel disk 2, and an ornamental hub cap 3.

Wheel 1 includes a drop center tire rim 4 of the type which includes a base flange 5, opposite intermediate flanges 6, and opposite edges 7. This rim is secured to a nave or body part 8 of the wheel, which part has at its outer periphery a lateral extending flange 9 secured in any suitable manner to base flange 5 of rim 4. As best seen in Figure 5, flange 9 is serrated, that is to say, is provided with a series of substantially equally spaced projections 9'. Vehicle wheels are often manufactured in this manner in order to reduce the weight of the wheel without a material reduction in its strength. The spaces between the serrations or projections 9' extend back slightly beyond the inner edge of rim 4 in order to provide a series of annular ventilation openings or apertures, through which air may freely circulate to cool brake drum 14.

Body part 8 has a turned edge or shoulder 10 adjacent the center of the wheel, and a circular holding flange 11, which is adapted to be secured by five cap screws or bolts 12 to a vehicle axle part 13, the latter being attached in the usual manner to a vehicle brake drum 14.

Secured to flange 11 are five hub cap retaining spring elements 15. Each spring element includes an outwardly extending leg which terminates in a hook-like end 16, which is resilient and is adapted to have the hub cap 3 snapped into engagement therewith for securing the hub cap in place.

The hub cap comprises a hollow shell including an inwardly turned skirt 17, shaped to engage against the shoulder 10 of the wheel body part. This skirt 17 terminates in a turned edge 18 over which the hook-like ends 16 of the five spring elements are adapted to slide as the hub cap is forced axially into retaining engagement with the spring elements.

Secured to the outer side surface of wheel 1, is an ornamental wheel disk 2, preferably made of metallic sheet material. Wheel disk 2 is shaped to intimately overlie the tortuous configuration of that portion of body part 8 which lies between shoulder 10 and flange 9, but it is so shaped near its outer marginal edge that it rests in spaced relationship with respect to the outer side surface of rim 4. The inner portion of disk 2 is centrally apertured and extends, as indicated at 19, beneath hub cap 3, which aids in holding this part of the disk tightly against wheel 1. The outer marginal edge of disk 3 is underturned as indicated at 20, to provide an interior channel 21 (as may best be seen in Figure 3).

Wheel disk 2, as shown in Figures 1 to 3 of the drawings, is provided with an annular groove or indentation 22, which indentation lies substantially adjacent the junction point of body part 8 and rim 4. In the region of this indentation, the disk is provided with a plurality of underturned tooth-like projections or tabs 23 which are adapted to secure disk 2 to body part 8 in a manner which will presently be explained. These projections or tabs are integral with the disk and are preferably struck directly from the disk leaving a plurality of openings 24 in the disk.

In accordance with the principles of this invention, tabs 23 are formed having a width dimension which is slightly less than the distance between adjacent projections 9' on flange 9, and are thus adapted to extend into the spaces between projections 9'. By reason of the above disposition of tabs 23 with respect to projections 9', it will readily be understood that the apertures 24, which are caused by striking out tabs 23 from disk 2, are in substantial coincidence with the ventilation apertures in wheel 1 caused by the spaces between projections 9'.

In assembling ornamental disk 2 on wheel 1, the disk is placed over the outer side surface of wheel 1 and tabs 23 are bent down over the edge of body part 8 either manually or by machine. Hub cap 3 is then snapped into engagement over spring element 16.

From the above description, it will be seen that I have constructed an ornamental wheel disk which is extremely economical to manufacture, which provides the required ventilation for the wheel and its associated structures, and which may readily and quickly be secured firmly thereto.

In Figures 6, 7 and 8 of the drawings, I have illustrated a slightly modified embodiment of my invention. That portion of the wheel and its associated elements which are similar to those illustrated in Figures 1 to 5 of the drawings, have been given the same reference numerals.

In this embodiment of my invention, the marginal edge of disk 2 which lies beyond the indentation 22 has been given a slightly different configuration. In this case, the marginal edge or apron 25 lies in intimate contact with rim 4 at a point slightly above apertures 24. It need not lie in intimate contact with rim 4, however, throughout its entire length, but may be given any desired configuration which is pleasing to the eye and which will enhance the general appearance of the wheels or vehicle as a whole. In order to eliminate vibration of the disk, it is desirable that the outer periphery 26 of disk 2 rest firmly against rim 4, preferably under slight pressure.

While I have shown particular embodiments of my invention, it will of course be understood that I do not wish to be limited thereto since many modifications may be made, and I therefore contemplate by the appended claims to cover all such modifications as fall within the true spirit and scope of my invention.

I claim as my invention:

1. The combination of a wheel of the type having a drop center rim and a body part, said body part including a laterally extending serrated flange lying in intimate contact with said rim and secured thereto, and an ornamental disk disposed on the outer side surface of said wheel and having a central opening adapted to receive a hub cap having a skirt formed to extend into and be retained in said body part, said disk including a plurality of tabs disposed between the serrations of said flange and an annular portion disposed radially outward of said tabs for embracing a side flange of the wheel rim.

2. The combination of a wheel of the type having a drop center rim and a body part, said body part including a laterally extending serrated flange lying in intimate contact with said rim and secured thereto, and an ornamental disk disposed on the outer side surface of said wheel and having a central opening adapted to receive a hub cap having a skirt formed to extend into and be retained in said body part, said disk including a plurality of tabs struck out from an intermediate portion of said disk disposed between the serrations of said flange, thereby firmly to secure said disk to said wheel.

3. The combination of a wheel of the type having a drop center rib and a body part having a laterally extending serrated flange lying in intimate contact with said rim and secured thereto, the serrations of said flange being of sufficient depth to provide a plurality of apertures in the wheel through which air may freely circulate, and an ornamental disk disposed over the outer side surface of said wheel and having a central opening for accommodating a hub cap having a skirt extending into and retained in said body part, said disk including a plurality of tabs struck out from said disk disposed between the serrations of said flange, the struck out portions of said disk being in substantial coincidence with said apertures and radially inward of a continuous uninterrupted outer edge of the disk.

4. In combination in a wheel construction, a wheel including rim and body parts, said body part having a plurality of spaced free edges, and a wheel cover disposed over an outer side of the wheel for cooperation with said parts and including an intermediate depressed section positioned adjacent the junction of said wheel parts and apertured to provide for ventilation through said cover and wheel, said depressed section having spaced tabs hooked axially and radially inward over said spaced edges in said body part to maintain said cover in tight cooperation with said wheel part.

5. In combination with a wheel including rim and body parts and a wheel cover disposed over an outer side surface of said wheel for cooperation therewith, said body part including a laterally extending serrated flange in contact with said rim and secured thereto, and said cover having a plurality of integral tabs substantially permanently hooked radially inward over said body part between the serrations of said flange and securing the cover against removal from the outer side of the wheel.

6. In combination with a wheel having a rim and body part, said body part being provided with apertures therein in proximity to said rim to permit air circulation through said wheel, an ornamental member adapted to cover the outer side surface of said body part and a portion of said rim, said member being provided with a plurality of integral tabs struck out from said member which extend into said apertures and engage said body part, said struck out portions of said member being of such dimensions as to form apertures in said disk which substantially coincide with the apertures in said body part.

7. In a vehicle wheel assembly adapted to be mounted on an axle and brake drum assembly, a wheel body part, and a drop center rim, said body part having in proximity to said rim an annular series of elongated apertures through which air may freely circulate to cool said brake drum, the combination with said body part and said rim of an ornamental sheet metal member adapted to cover a substantial portion of the outer side surface of said body part and said rim, said member being in substantial contact with the surface of said body part but being disposed in spaced relationship with respect to said rim except at its marginal edge, and means including a plurality of tabs having a width substantially equivalent to the width dimension of said apertures struck from said member which extend through said apertures and secure said member to said wheel assembly.

8. In a vehicle wheel assembly adapted to be mounted on an axle and brake drum assembly, a wheel body part, and a drop center rim, said body part having in proximity to said rim an annular series of elongated apertures through which air may freely circulate to cool said brake drum, the combination with said body part and said rim of an ornamental sheet metal member adapted to cover a substantial portion of the outer side surface of said body part and said rim, said member being in substantial contact with the surface of said body part but being disposed in spaced relationship with respect to said rim except at its marginal edge, said member also being provided with a plurality of apertures disposed radially inward of said marginal edge and in substantial coincidence with the apertures of said body part, and a corresponding number of tabs integral with said member at points adjacent said apertures and which extend into the apertures of said body part to secure said member thereto.

9. In combination with a wheel including rim and body parts, an ornamental ring-like member associated with a portion of said rim part and having an intermediate depressed annular section positioned adjacent the junction of said parts, and axially extending spaced means at said junction for attachably securing said intermediate depressed section directly to a radially outer portion of said body part.

10. In combination with a wheel including rim and body parts, an ornamental ring-like member embracing a portion of said rim part, and means positioned radially inward of the rim part comprising a plurality of axially extending fingers on said ring-like member and deflected in a radial direction for engagement with an outer portion of said body part to attach said ring-like member to said body part.

11. In a wheel including a wheel body provided with attaching openings, an ornamental cover for the wheel body comprising a circular member having circumferentially spaced attaching projections extending axially and radially inward thereof, said projections being deflected and given a substantially permanent set to dispose said projections in tight securing engagement with the edges of said attaching openings in the wheel body for securing the member to the wheel body against removal from the outer side of the wheel.

GEORGE ALBERT LYON.